United States Patent Office 3,364,275
Patented Jan. 16, 1968

3,364,275
PREPARATION OF BENZOCORONENE AND INTERMEDIATES
Gilbert Stork, Leonia, N.J., and Ken Matsuda, Stamford, Conn., assignors to American Cyanamid Company, Stamford, Conn., a corporation of Maine
No Drawing. Filed Feb. 8, 1966, Ser. No. 525,855
3 Claims. (Cl. 260—668)

This invention relates to a process for the preparation of 1,2-benzocoronene.

1,2-benzocoronene exhibits photochromism and is therefore useful in variable transmission devices such as sunglasses, data display and storage systems, photocopying devices, photographic masking, and signal processing.

A known synthesis of 1,2-benzocoronene is a seven step process beginning with perylene. See Clar et al., J. Chem Soc., 4616 (1957). The method is disadvantageous, however, since the numerous steps add to the expense of the synthesis. Moreover, the intermediates resulting from the various steps must be substantially purified thereby also adding to the cost and inconvenience of the overall process. Further, when the crude yields for each step are combined an overall yield of about 10% can be calculated. It is evident, however, that the overall yield of a product to have sufficient purity for commercial applications will be substantially lower due to the loss of material in the several intermediate purifications required.

One of the intermediates formed in the Clar et al. process is 1,12-benzoperylene (II):

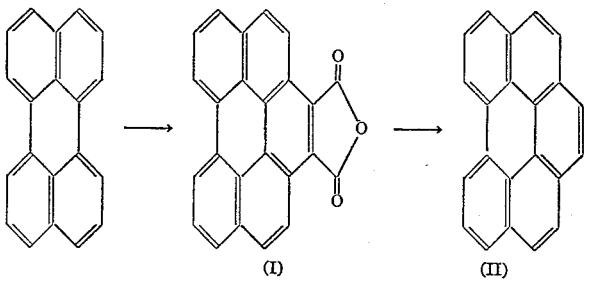

This intermediate results from the oxidative Diels-Alder condensation of perylene with maleic anhydride and chloranil to form benzoperylene dicarboxylic anhydride (I) followed by decarboxylation of (I) with soda-lime at about 350° C.

In accordance with the present invention, 1,2-benzocoronene (III) is prepared in good yield by a convenient one-step reaction of 1,12-benzoperylene (II) and benzyne as follows:

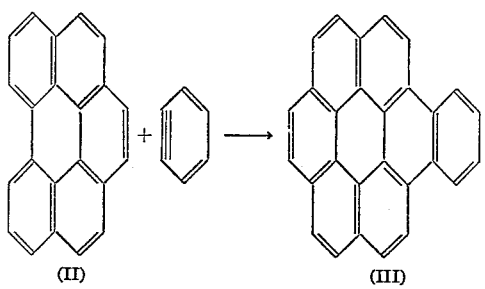

The benzyne is employed in a molar excess, i.e., in the range of from about 2–10 moles of benzyne per mole of perylene, and preferably 3–5 moles of benzyne per mole of perylene. The molar excess of benzyne is required not only for addition to the 1,12-benzoperylene but also to effect dehydrogenation of the product to the aromatic state. The latter result is surprising since under the mild conditions of the reaction it had been expected that the non-dehydrogenated product would form:

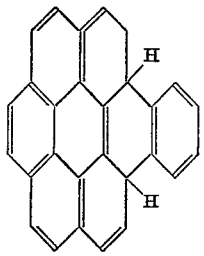

It appears that at least a second mole of benzyne must be present to act as a hydrogen acceptor. The combined condensation and dehydrogenation thus distinguishes the present reaction from known reactions of benzyne with polynuclear hydrocarbons.

The benzyne is conveniently provided in the reaction mixture by in situ generation in a known manner. Illustrative of such reactions to form benzyne are the following:

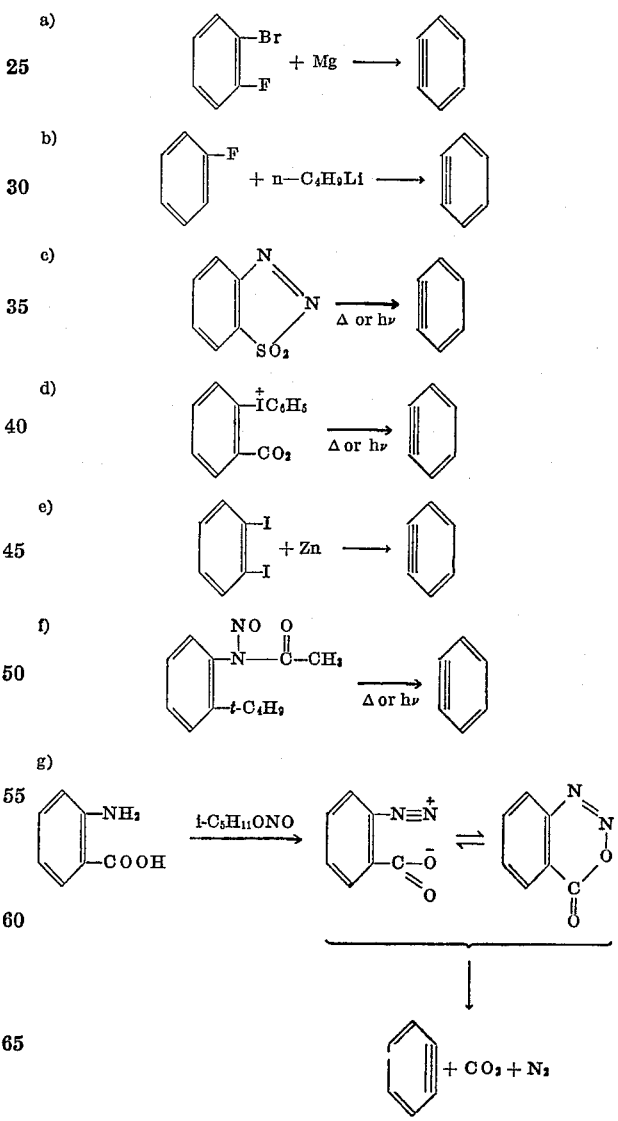

Reactions such as the foregoing are described in R. Huisgen, "Organometallic Chemistry," edited by H. Zeiss, Reinhold Publishing Corp., New York, 1960, pp. 36–87; J. F. Bunnett, J. Chem. Ed., 38, 278 (1961); H. Heaney, Chem. Revs., 62, 81 (1962); Freedman and Logullo, J. Am. Chem. Soc., 85, 1549 (1963). Of the foregoing the method of Freedman and Logullo [reaction (g) above] is preferred.

The reaction is desirably conducted in a solvent medium employing one or a mixture of known solvents for the reactants until reaction is essentially complete. Such solvents include, for example, methylene chloride, acetonitrile, dioxane, and benzene. The temperature of the reaction is not critical and is generally the reflux temperature determined by the boiling point of the solvent. In the case of methylene chloride the preferred temperature will be in the range of about 40–50° C. at atmospheric pressure.

Since benzyne is extremely reactive it should not be present all at once. Hence, it is desirable to add benzyne or its generating antecedents gradually to the 1,12-benzoperylene.

When the benzyne is generated by the reaction of isoamyl nitrite and anthranilic acid, particularly when solvents boiling higher than methylene chloride are employed, it is preferred to add the anthranilic acid gradually to the solution of isomayl nitrite and 1,12-benzoperylene or to add the isoamyl nitrite concurrently with the solution of anthranilic acid to minimize the thermal decomposition of the nitrite or destruction of benzyne by anthranilic acid. The mole ratio of the isoamyl nitrite to anthranilic acid is generally equimolar, preferably with a slight excess of isoamyl nitrite to allow for some thermal decomposition.

The total concentration of reactants to form the benzyne will be such as to provide amounts effective for reaction with 1,12-benzoperylene as described above. Reaction is desirably conducted in an inert atmosphere. Product 1,2-benzocoronene is formed as a solid and may be removed from the reaction mixture by filtration and further purified if desired.

Except where indicated above the reactions may be batch, continuous or semi-continuous and atmospheric, sub-atmospheric or super-atmospheric pressures may be utilized.

The invention is further described in the following example which is not intended to limit the invention except as defined in the appended claims. All parts and percentages are by weight unless otherwise indicated.

*Example.—Preparation of benzocoronene from 1,12-benzoperylene*

To a stirred, nitrogen-flushed, refluxing mixture of 0.083 gram (0.3 millimole) of 1,12-benzoperylene and 0.129 gram (1.1 millimoles) of isoamyl nitrite in 10 ml. of methylene chloride, was added dropwise during three hours a solution of 0.137 gram (1.0 millimole) of anthranilic acid in 1.0 milliliter of tetrahydrofuran. The resulting brown mixture was stirred under reflux for an additional hour and then evaporated under vacuum. A strong odor of isoamyl alcohol could still be detected. The residue was dissolved in xylene and boiled to remove the isoamyl alcohol. The resulting amber solution (about 800 milliliters) was chromatographed on alumina to give the following four fractions which were evaporated in a rotary film evaporator and dried in a vacuum oven:

(1) No color, no fluorescence—discarded.

(2) Orange-yellow solid, blue-white fluorescence in solution. Infrared analysis showed this material to be almost pure benzoperylene.

(3) Orange smear on side of flask, soluble in acetone. This material contained two carbonyl impurities and an aromatic material different from #2 and #4.

(4) Yellow solid, green-yellow fluorescence in solution. Infrared analysis showed this material to be pure 1,2-benzocoronene in satisfactory yield.

We claim:

1. A process for the preparation of 1,2-benzocoronene which comprises reacting 1,12-benzoperylene and a molar excess of benzyne.

2. The process of claim 1 wherein the mole ratio of reactants is 3–5 moles of benzyne per mole of 1,12-benzoperylene.

3. The process of claim 1 wherein the benzyne is generated in situ by the reaction of isoamyl nitrite and anthranilic acid.

References Cited

UNITED STATES PATENTS

| | | | |
|---|---|---|---|
| 3,121,122 | 2/1964 | Reimlinger | 260—668 |
| 3,132,187 | 5/1964 | Turetzky | 260—668 |

DELBERT E. GANTZ, *Primary Examiner.*

C. R. DAVIS, *Assistant Examiner.*